C. S. ROUSE.
Fly-Traps.

No. 143,423. Patented Oct. 7, 1873.

Witnesses.
S. H. Wheely
J. O. Wheeler

Inventor.
Constant S. Rouse

UNITED STATES PATENT OFFICE.

CONSTANT S. ROUSE, OF DOWAGIAC, MICHIGAN.

IMPROVEMENT IN FLY-TRAPS.

Specification forming part of Letters Patent No. 143,423, dated October 7, 1873; application filed March 31, 1873.

*To all whom it may concern:*

Be it known that I, CONSTANT S. ROUSE, of Dowagiac, county of Cass and State of Michigan, have invented certain Improvements in Fly-Traps, of which the following is a specification:

This invention relates to a class of fly-traps in which the bait is placed under and outside of the snare-chamber, the object being to place the bait in a more conspicuous position, equally easy of access from all sides, and render the escape of flies from the snare-chamber more difficult and intricate.

Figure 1:
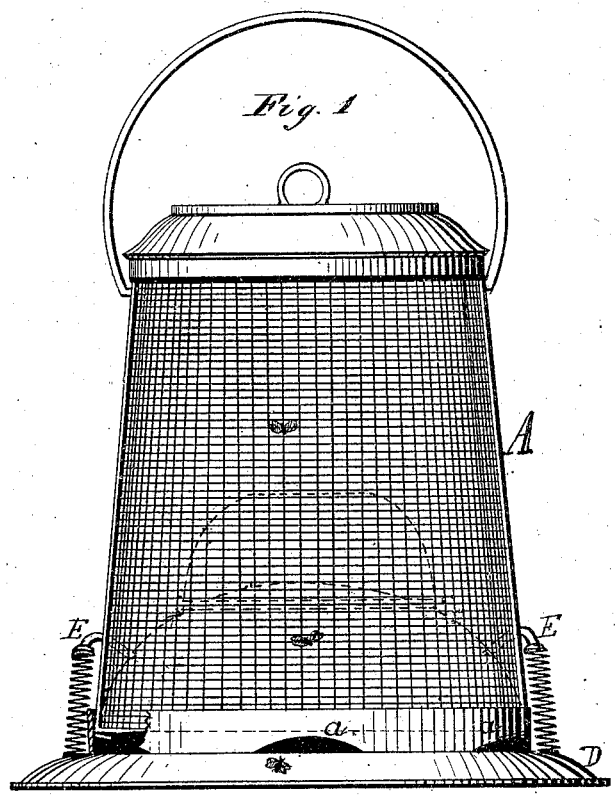
Figure 2:
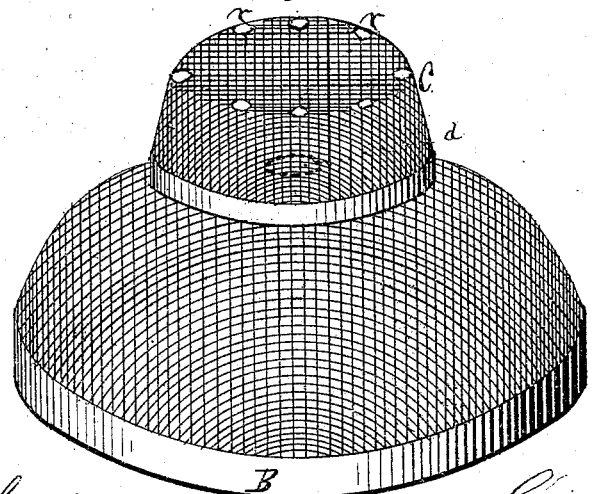

The accompanying drawing forms a part of this specification, and shows, in Figure 1, a perspective view of a device embodying my invention. Fig. 2 shows the bait-chamber and truncated cone-shaped chamber attached.

The letters of reference marked thereon denote the parts represented by similar letters in the specification, of which A represents the body of the trap or snare-chamber. This chamber is cylindrical in form, and made of woven wire, open at the bottom and covered at the top, and has a portion of the lower edge of the base cut away at short intervals, as seen at $a$ $a$, for the passage of flies to the bait-chamber on all sides. B represents the bait-chamber. This chamber is formed concavo-convex, and is made sufficiently large at the base to fit snugly within the base of the snare-chamber A. A hole, $d$, is made in the center of the top of this chamber, through which the flies pass to the interior of the chamber C. This chamber is situated centrally on top of the bait-chamber, and is provided with several holes, $r$ $r$, leading from it to the interior of the body of the trap or snare-chamber A. These holes are made in the angle formed by the junction of the sides with the top. By making these holes in the angle, as described, the fly, if disposed to work downward after entering the snare-chamber, not finding any holes in the top surfaces of the chamber C, will be most likely to pass down the interior precipitous sides of this chamber; thus his return to the bait-chamber is foiled. The snare-chamber is mounted on a nearly-flat disk, D, to which the body of the trap is attached by means of the elastic hooks E E. This disk is somewhat larger in diameter than the snare-chamber, giving the trap a broad and steady foundation, and, as said disk is nearly flat, the bait-chamber can be entered from a horizontal plane, and the bait, which is placed on the center of said disk, may be approached from all sides.

Having thus fully described my invention, what I claim is—

The fly-trap consisting of the snare-chamber A, bait-chamber B, truncated cone-shaped chamber C, having holes, as described, and disk D, provided with the elastic hooks E E, when constructed and combined as and for the purposes set forth.

CONSTANT S. ROUSE.

Witnesses:
    B. W. SCHERMERHORN,
    T. W. ADAMS.